2 Sheets—Sheet 1.

G. M. STEVENS & J. C. HINCHMAN,

Said HINCHMAN, assignee, by mesne assignments, of said STEVENS, and of the several administrators of C. STEVENS & S. S. TURNER, deceased.

Hand Stamp.

No. 9,491. Reissued Dec. 7, 1880.

Witnesses.

Miller C. Earl

M. S. Lockwood French.

Inventors,

George M. Stevens,

John C. Hinchman,

Assignee of Sidney S. Turner and Collins Stevens, dec'd.

for Frank L. Pope Attorney.

G. M. STEVENS & J. C. HINCHMAN,

Said HINCHMAN, assignee, by mesne assignments, of said STEVENS, and of the several administrators of C. STEVENS & S. S. TURNER, deceased.

Hand Stamp.

No. 9,491. Reissued Dec. 7, 1880.

Witnesses;
Miller C. Earl
Mse P. Lockwood French

Inventors,
George M. Stevens,
John C. Hinchman
Assignee of Sidney S. Turner and Collins Stevens. decd.
per Frank L. Pope. Attorney.

UNITED STATES PATENT OFFICE.

GEORGE M. STEVENS, OF CAMBRIDGE, MASSACHUSETTS, AND JOHN C. HINCHMAN, OF SUMMIT, NEW JERSEY; SAID HINCHMAN ASSIGNEE, BY MESNE ASSIGNMENTS, OF SAID STEVENS AND OF THE SEVERAL ADMINISTRATORS OF COLLINS STEVENS AND SIDNEY S. TURNER, DECEASED.

HAND-STAMP.

SPECIFICATION forming part of Reissued Letters Patent No. 9,491, dated December 7, 1880.

Original No. 117,832, dated August 8, 1871; antedated July 27, 1871. Application for reissue filed October 9, 1880.

*To all whom it may concern:*

Be it known that SIDNEY S. TURNER, late of Westborough, in the county of Worcester, and COLLINS STEVENS, late of Boston, in the county of Suffolk, and GEORGE M. STEVENS, of Cambridge, in the county of Middlesex, and State of Massachusetts, did jointly invent a new and useful Improvement in Automatic Hand-Stamps, of which the following is a specification.

The nature of the invention consists in the combination of movable type, adapted to print characters denoting time, with a continuously-moving time-train or clock-movement for imparting a regular progressive motion to said type, and a platen for taking an impression thereof, whereby the proper day, hour, or minute at which an impression is taken will be automatically recorded, the proper types or characters for that purpose being brought into a position for action by means of the time-train.

Figure 1:
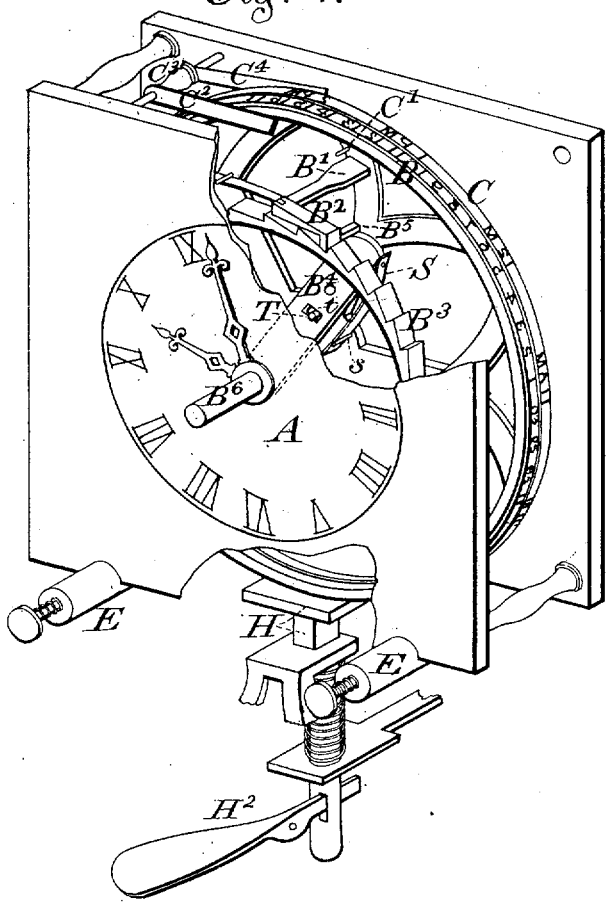
Figure 2:
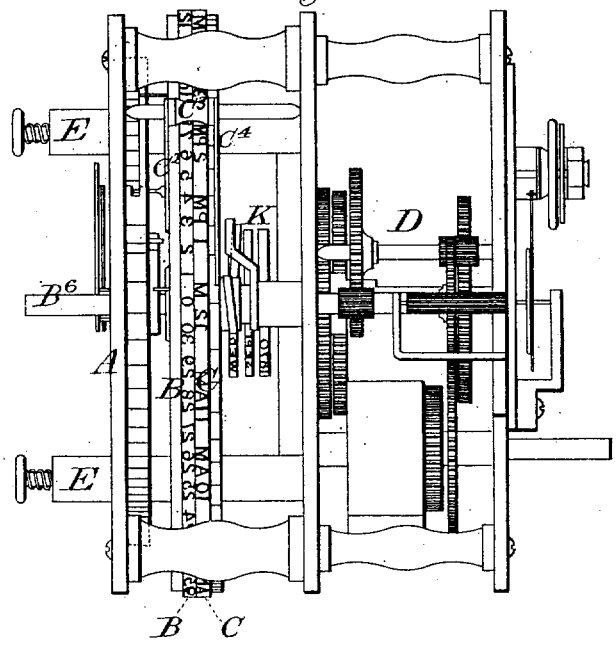
Figure 3:
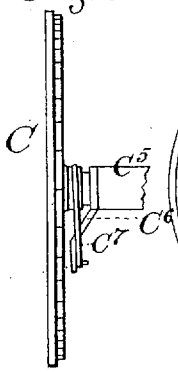
Figure 4:
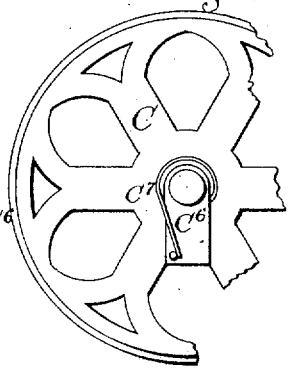
Figure 5:
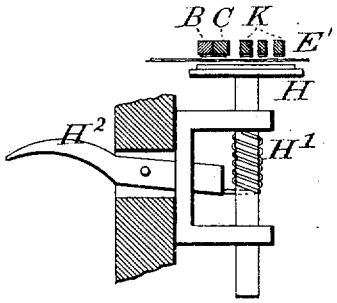

Figure 1 is a perspective view of an apparatus embodying the invention. Fig. 2 is a top view of the same. Figs. 3 and 4 are detail views of a portion of the mechanism, and Fig. 5 shows the platen and the mechanism for actuating the same.

Referring to Fig. 1, A represents the face of an ordinary clock provided with hands, &c., of which D in Fig. 2 represents the usual movement. This movement may be driven by weights or springs, and may be varied in strength and proportion to suit the style of stamp to be made.

B, Figs. 1 and 2, is a large wheel, upon the periphery of which are affixed figures or characters indicating numbers from 1 to 60, which are intended to denote minutes of the hour. Upon another similar wheel, C, are affixed letters and figures to denote the hours of the day. The wheels K, Fig. 2, have upon their peripheries letters and figures to indicate the day of the month, the month, and the year.

An intermittent progressive motion is given to the wheel B by the following device: $B^4$ is an arm attached to the minute-spindle $B^6$. This spindle $B^6$ makes a complete revolution in one hour and carries with it the arm $B^4$. The arm $B^4$ is connected with the wheel B by the pin T, Fig. 1, in such a manner that it may have a limited motion independent of the wheel, the extent of this motion being governed by the slot *t* in the arm, and amounting to a sixtieth of a revolution.

S is a spring attached to the arm $B^4$ and pressing against the pin *s* in the wheel B, so that as the arm $B^4$ advances, it, acting through the spring S, will bring a pressure on the pin *s* and have a tendency to revolve the wheel B. The wheel B is prevented from turning by the pawl $B^2$, which is attached by the standard $B'$ and comes in contact with the fixed ratchet $B^3$, Fig. 1. This pawl $B^2$ has a lifting-pin, $B^5$, projecting from its outer end. This lifting-pin $B^5$ rests upon the cam end of the arm $B^4$, the end of the arm being so shaped as to form a segment of a cam of such character that when the pin $B^5$ is acting upon one part of it it will allow the pawl $B^2$ to catch on the teeth of the fixed ratchet $B^3$; but as the arm advances, sliding under the pin $B^5$, it will cause it to rise, and, lifting the pawl $B^2$ out of contact with the ratchet $B^3$, allow the wheel B to be advanced by the spring S until the pawl $B^2$ falls into the next tooth. This action causes the pin $B^5$ to advance to the lower or forward edge of the cam end of the arm $B^4$, and then to remain at rest until the repetition of the action above described. This intermittent motion of the wheel B takes place once each minute. Thus at every successive minute a different number is presented to the action of the platen.

The wheel C, having upon its periphery the characters denoting the hours, is moved forward regularly once every hour by the arm $C^6$, Figs. 3 and 4, which is attached to the common or hour pinion $C^5$. This arm $C^6$ acts on the wheel C through the spring $C^7$. The let-off for the hour-wheel C consists in the pawl $C^4$, Fig. 1, which acts upon a ratchet on the wheel C, as shown in Fig. 2. The pawl $C^4$ is raised by the arm $C^2$, Fig. 1, which is acted upon by the pin $C'$ in the wheel C. As the wheel C revolves but once in an hour, the pin $C'$ will only act upon the arm $C^2$ and pawl $C^4$ once per hour. Thus the wheel C can move but one notch per hour—that is, at each hour a new number, representing the hour of the day, will be presented to the stamp. The wheels K, carrying numbers and letters to indicate the days of the month, the months, and the years, are not shown herein as automatic; but they may be made so by applying to them similar mechanism to that applied to the wheels C and B.

Fig. 5 represents the stamping device, which may consist of a color-ribbon, E′, which is placed, as shown, immediately under the wheels B, C, and K, and above the platen H. The platen H is operated by the lever H′, and serves to press the paper to be stamped against the ribbon E′, through which the number and figures on the peripheries of the wheels B, C, and K print, as in the ordinary hand-stamp.

The advantages which this stamp possesses over the ordinary one are, that the dates are brought into position automatically, and that the exact time to a minute is stamped. A stamp of this kind can readily be made so that it need be adjusted but once a month, or even, if desirable, but once in a year.

What is claimed as the joint invention of the said SIDNEY S. TURNER, COLLINS STEVENS, and GEORGE M. STEVENS, and for which Letters Patent are desired, is—

1. The combination of movable type adapted to print characters denoting time, a continuously-moving time-train or clock-movement for imparting a regular progressive motion to said type, and a platen for taking an impression thereof.

2. The combination of movable type adapted to print characters denoting the minutes of the hour, a continuously-moving time-train for imparting a regular progressive motion to said type, and a platen for taking an impression thereof.

3. The combination of movable type adapted to print characters denoting the hours of the day, a continuously-moving time-train for imparting a regular progressive motion to said type, and a platen for taking an impression thereof.

4. The combination of two independent types or sets of types, respectively adapted to print characters denoting the minutes of the hour and the hour of the day, a continuously-moving time-train adapted to communicate an independent progressive movement to each of the said type or sets of type, and a platen adapted to take an impression from both type or sets of type simultaneously.

5. The combination of movable type adapted to print characters denoting the lesser divisions of time, a continuously-moving time-train for imparting a regular progressive motion to said type, movable type adapted to print characters denoting the greater divisions of time, but not under the control of the time-train, and a platen for taking an impression from both sets of type simultaneously.

6. The combination of movable type adapted to print characters denoting time, a time-train for moving said type, and mechanism, substantially such as described, whereby the continuous movement of the time-train is communicated to the movable type at determinate intervals.

GEO. M. STEVENS.
JOHN C. HINCHMAN,

*Assignee of Sidney S. Turner and Collins Stevens, deceased.*

Witnesses:
FRANK L. POPE,
ELMER P. HOWE.